(12) United States Patent
Biswas et al.

(10) Patent No.: US 10,885,444 B2
(45) Date of Patent: Jan. 5, 2021

(54) APPLICATION TOOL RECOMMENDATIONS

(71) Applicant: Adobe Inc., San Jose, CA (US)

(72) Inventors: Sanjeev Kumar Biswas, Bangalore (IN); Palash Chauhan, Kakrapara (IN); Naman Jain, Rajasthan (IN); Aditya Gupta, Etawah (IN)

(73) Assignee: Adobe Inc., San Jose, CA (US)

( * ) Notice: Subject to any disclaimer, the term of this patent is extended or adjusted under 35 U.S.C. 154(b) by 837 days.

(21) Appl. No.: 15/456,212

(22) Filed: Mar. 10, 2017

(65) Prior Publication Data

US 2018/0260718 A1 Sep. 13, 2018

(51) Int. Cl.
*G06N 5/04* (2006.01)
*G06N 20/00* (2019.01)
*G06N 7/00* (2006.01)
*G06F 16/332* (2019.01)
*G06F 40/20* (2020.01)
*G06F 16/2457* (2019.01)

(52) U.S. Cl.
CPC .......... *G06N 5/04* (2013.01); *G06F 16/24578* (2019.01); *G06F 16/3322* (2019.01); *G06F 40/20* (2020.01); *G06N 7/005* (2013.01); *G06N 20/00* (2019.01)

(58) Field of Classification Search
CPC .......... G06N 5/04; G06N 20/00; G06N 7/005; G06F 16/3322; G06F 16/24578; G06F 17/27
See application file for complete search history.

(56) References Cited

U.S. PATENT DOCUMENTS

| 5,442,759 A | 8/1995 | Chiang et al. |
| 5,493,658 A | 2/1996 | Chiang et al. |
| 5,535,422 A | 7/1996 | Chiang et al. |
| 6,343,237 B1 | 1/2002 | Rossow et al. |

(Continued)

OTHER PUBLICATIONS

Murphy-Hil, "Improving Software Developers" Fluency by Recommending Development Environment Commands, 2012 (Year: 2012).*

(Continued)

*Primary Examiner* — Ann J Lo
*Assistant Examiner* — Van C Mang
(74) *Attorney, Agent, or Firm* — SBMC

(57) ABSTRACT

Application tool recommendations are described. Initially, application usage data is captured indicating tools used and actions performed by existing users of an application. This application usage data is converted into human-readable words describing the tools used and actions performed. This allows natural language processing techniques to be applied to the converted data. Through natural language processing, importance scores for the tools and actions can be computed and tasks performed with the application determined. The natural language processing techniques are also used to build task prediction models based on the importance scores and determined tasks. These task prediction models indicate probabilities of the determined tasks to be next performed by a current application user. A task having the highest probability of being next performed is predicted as the next task. Tool recommendations associated with the predicted next task are then presented to aid the user with the predicted next task.

20 Claims, 8 Drawing Sheets

(56) References Cited

U.S. PATENT DOCUMENTS

| | | | |
|---|---|---|---|
| 7,251,781 B2* | 7/2007 | Batchilo | G06F 40/30 715/210 |
| 7,415,714 B2 | 8/2008 | Chapman | |
| 9,449,524 B2 | 9/2016 | Bruce et al. | |
| 9,649,556 B1 | 5/2017 | Curtis et al. | |
| 9,704,231 B1 | 7/2017 | Kulewski et al. | |
| 10,002,199 B2* | 6/2018 | Soto Matamala | G06F 16/29 |
| 10,261,672 B1* | 4/2019 | Dolbakian | G06F 3/04883 |
| 10,769,738 B2 | 9/2020 | Chang et al. | |
| 10,831,516 B1 | 11/2020 | Gupta et al. | |
| 2002/0091993 A1 | 7/2002 | Walley et al. | |
| 2004/0086834 A1 | 5/2004 | Harned et al. | |
| 2006/0259613 A1 | 11/2006 | Othmer | |
| 2007/0015118 A1 | 1/2007 | Nickell et al. | |
| 2014/0310596 A1 | 10/2014 | Lafreniere et al. | |
| 2015/0121217 A1 | 4/2015 | O'Donoghue et al. | |
| 2017/0010903 A1 | 1/2017 | Kidron et al. | |
| 2017/0011645 A1 | 1/2017 | Bruce et al. | |
| 2018/0189077 A1 | 7/2018 | Gupta et al. | |
| 2018/0336044 A1 | 11/2018 | Want et al. | |
| 2019/0096280 A1 | 3/2019 | Saunders et al. | |
| 2019/0287197 A1 | 9/2019 | Chang et al. | |

OTHER PUBLICATIONS

Davison, "predicting Sequences of User Actions", 1988 (Year: 1988).*

Lee, "Visualization and Analysis of Clickstream Data of Online Stores for Understanding Web Merchandising", 20001 (Year: 2001).*

Murphy-Hill, "Improving Software Developers' Fluency by Recommending Development Environment Commands", 2012 (Year: 2012).*

Davison, "Predicting Sequences of User Actions", 1988 (Year: 1998).*

Kang, "AWSR: Active Web Service Recommendation Based on Usage History", IEEE, 2012 (Year: 2012).*

Huang, "Improving Word Representations via Global Context and Multiple Word Prototypes", 2012 (Year: 2012).*

Zhong, "Time-Aware Service Recommendation for Mashup Creation in an Evolving Service Ecosystem", IEEE, 2014 (Year: 2014).*

Movshovitz-Attias, "Natural Language Models for Predicting Programming Comments", 2013 (Year: 2013).*

Blei, "Latent dirichlet allocation", Journal of Machine Learning Research, Jan. 2003, 30 pages.

Davison, "Predicting Sequences of User Actions", Notes of the AAAI/ICML 1998 Workshop on Predicting the Future: AI Approaches to Time-Series Analysis, Nov. 1998, 8 pages.

Guthrie, "A Closer Look at Skip-gram Modelling", Proceedings of the 5th International Conference on Language Resources and Evaluation, Aug. 2006, 4 pages.

Hartmann, "Prediction Algorithms for User Actions", Conference: LWA 2007, Jan. 2007, 6 pages.

Masthoff, "Group recommender systems: Combining individual models", Recommender systems handbook. Springer US, 2011, Oct. 5, 2010, 25 pages.

Mikolov, "Efficient estimation of word representations in vector space", arXiv preprint arXiv:1301.3781 (2013), Sep. 7, 2013, 12 pages.

Mikolov, "Distributed Representations of Words and Phrases and their Compositionality", Advances in neural information processing systems., Oct. 2013, 9 pages.

Montgomery, "Modeling online browsing and path analysis using clickstream data", Marketing Science 23.4, Feb. 24, 2004, 36 pages.

Schultz, "Topic Detection and Tracking using idf-Weighted Cosine Coefficient", Proceedings of the DARPA broadcast news workshop. San Francisco: Morgan Kaufmann, Aug. 2000, 4 pages.

Siersdorfer, "Social recommender systems for web 2.0 folksonomies", Proceedings of the 20th ACM conference on Hypertext and hypermedia. ACM, 2009, Jul. 1, 2009, 9 pages.

Wang, "Collaborative Topic Modeling for Recommending Scientific Articles", Proceedings of the 17th ACM SIGKDD International Conference of Knowledge Discovery and Data Mining ACM, Aug. 2011, 9 pages.

"Pre-Interview First Office Action", U.S. Appl. No. 15/925,259, dated Jul. 1, 2019, 4 pages.

"Combined Search and Examination Report", GB Application No. 1817945.7, dated Apr. 5, 2019, 7 pages.

"First Action Interview Office Action", U.S. Appl. No. 15/925,259, dated Mar. 10, 2020, 3 pages.

"Foreign Office Action", GB Application No. 1817945.7, dated Apr. 9, 2020, 7 pages.

"Notice of Allowance", U.S. Appl. No. 16/813,441, dated Jul. 1, 2020, 14 pages.

"Notice of Allowance", U.S. Appl. No. 15/925,259, dated May 29, 2020, 7 pages.

"Foreign Office Action", GB Application 1817945.7, dated Jul. 28, 2020, 7 pages.

* cited by examiner

APPLICATION TOOL RECOMMENDATIONS

BACKGROUND

Computing applications range significantly in their perceived complexity. Some applications, for instance, are immediately intuitive. Many users may be able to leverage the functionality of these applications when first exposed to them without much, if any, instruction regarding how to use the applications. Other applications, however, may not be intuitive for most users. These applications may require at least some amount of prior knowledge, learning, or experimentation in order to utilize the corresponding functionality. Such applications may have an abundance of functionality buried in menus, accessible through particular dialogs, initiated by keyboard shortcuts, and so forth.

Conventional techniques for informing users about the functionality of applications involve enabling users to search for desired functionality and for how to accomplish certain tasks using an application. Responsive to a search, articles explaining how to use certain tools and videos demonstrating how to use the tools may be returned, such that a user can select to view the articles and videos. Providing information in this way, however, places the responsibility of obtaining more information about how an application can be used on the user. This may seem tedious to many users though. As a result, many users may not learn about functionality that may be useful to them or may not learn an easiest way to accomplish a task for which they use an application. Consequently, users may become frustrated with the application. User frustration can have widespread effects, such as users telling their family, friends, and coworkers that the application does not include functionality or is too difficult to use for certain tasks—when the application may include the functionality and the task may be more easily accomplished than conveyed. Effects can also include users discontinuing their subscriptions to a suite of such applications, deciding not to purchase applications based on information propagated by existing users, and so on.

SUMMARY

To overcome these problems, application tool recommendations are delivered in a digital medium environment. Initially, application usage data is captured that indicates tools used and actions performed by existing users of an application. This application usage data is then converted into human-readable language such that indications of the tools used and actions performed in the application usage data are converted to human-readable words describing the tools used and actions performed. This allows natural language processing techniques to be applied to the converted data. Through natural language processing, importance scores for the tools used and actions performed can be computed and tasks performed with the application can be determined. Further, the natural language processing techniques can be used to build task prediction models based on the importance scores and the determined tasks. These task prediction models are capable of indicating probabilities of determined tasks to be next performed by a current application user. A task having the highest probability of being next performed can be predicted as the next task. Tool recommendations associated with the predicted next task can be presented to aid the user in accomplishing the predicted next task.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
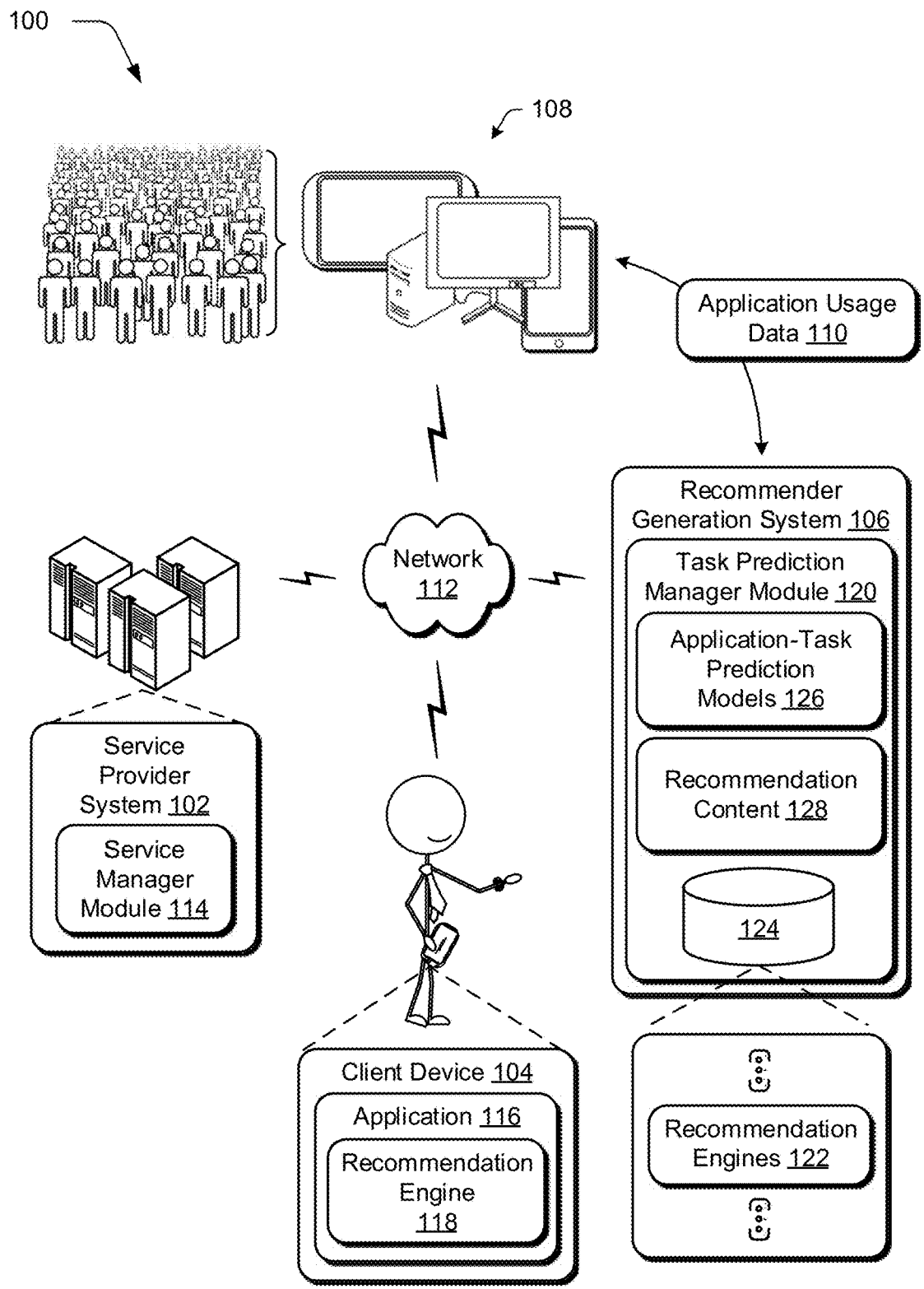
FIG. 1 is an illustration of an environment in an example implementation that is operable to employ techniques described herein.

Some computer applications require at least some amount of prior knowledge, learning, or experimentation in order to utilize the corresponding functionality. Conventional techniques for informing users about the functionality of these applications may be largely user initiated. To learn how to accomplish a task with an application, for instance, conventional techniques may involve a user initiating a search for functionality. This may seem tedious to many users though. As a result, many users may not learn about functionality that can be useful to them or may not learn an easiest way to accomplish a task with an application. Consequently, users may become frustrated with applications. User frustration can have widespread effects, such as users telling their family, friends, and coworkers that the application does not include functionality or is too difficult to use for certain tasks—when the application may actually include the functionality and the certain tasks may be more easily accomplished than conveyed. Effects can also include users discontinuing their subscriptions to a suite of such applications, deciding not to purchase applications based on information propagated by existing users, and so on.

To overcome these problems, application tool recommendations are delivered in a digital medium environment. In one or more implementations, as a user of an application uses its tools and performs actions with the tools, a next task is automatically predicted for the user. Based on the predicted next task, recommendations for tools are presented to the user. These recommendations can indicate tools that are useful for accomplishing the predicted next task, how to select the useful tools for the predicted next task, how to use the tools to accomplish the predicted next task, and so on.

The next task is predicted according to an application task prediction model, which is capable of indicating a probability of given task being performed next based on the tasks a user has already performed during a current session of interaction with the application. Unlike conventional approaches, these models are built from application data collected from existing users and using one or more natural language processing techniques, e.g., term frequency-inverse document frequency (TFIDF), Latent Diricklet allocation (LDA), Word2Vec models, and so forth.

To utilize natural language processing, the application usage data is initially converted from a form in which it is collected to human-readable language. The application usage data may be collected as clickstream data, for example. In general, clickstream data records parts of a screen that a user clicks on (e.g., with a mouse cursor or taps with a finger or stylus) while using a software application. Accordingly, the application usage data describes tools used and actions performed by a user within an application. Consider an example in which collected clickstream data indicates that a user selects a displayed button to position an object being modified behind other objects being modified. In accordance with the described techniques, this clickstream data may be converted to the text 'send_back'.

The application usage data also includes information that indicates a user session of interaction with an application, such that the application usage data can be grouped per session of interaction. By utilizing the above-discussed conversion, a document can be generated for each session of interaction with an application, such that a document includes the human-readable words corresponding to the tools used and actions performed by a user during the respective session. Moreover, a large number of these documents can be generated for a particular application by collecting usage data for many existing users of the application over multiple sessions. The natural language processing techniques discussed above can therefore be applied to a number of documents generated for a given application.

In one or more implementations, the natural language processing techniques are applied to a collection of documents generated for a particular application to determine importance scores for the tools used and actions performed with the application. Tasks, which comprise unordered groups of tools and actions for accomplishing a modification with the application, are then determined based on the importance scores. The tasks may be determined by applying to the documents a natural language processing technique that is generally used for determining topics of documents. The determined tasks are then generalized so that they apply to a wider range of scenarios. In particular, the tasks are generalized by clustering related tools (e.g., an ellipse creation tool and a rectangle creation tool), and replacing tool and action words with words indicative of a corresponding cluster (e.g., replacing 'ellipse_tool' and 'rectangle tool' with 'shape tool'). The natural language processing techniques can then be used to generate an application task prediction model for the particular application based on the tasks determined, the clusters of tools and actions, and the application usage data collected for the application.

In accordance with one or more implementations, the application task prediction model is packaged in a recommendation engine with associations to recommendation content. The associations associate each task that can be predicted with recommendation content that is to be presented when the task is predicted. Accordingly, when the recommendation engine predicts a next task using the application task prediction model it can reference the associations to retrieve and present the associated content.

As discussed in more detail below, the models may be built using data collected from existing users designated as experts, rather than beginner users. In this way, the recommendation engines may teach beginner and non-expert users how to use applications like expert users. Consequently, users of applications that employ the described techniques may become proficient with those applications more quickly than other applications. As a result of becoming proficient with these applications quicker, users may decide to continue their subscriptions for the application, tell others to purchase the applications, inform others that the applications have desired functionality and how to access that functionality, and so forth.

Term Descriptions

As used herein, the term "session" refers to a period during which a user interacts with a particular application and which has a particular starting point and a stopping point. Different starting and stopping points may be used to define sessions differently. An example of a starting and stopping point for defining a session may be when an application is launched (starting point) and when the application is exited (stopping point). Another example starting point is when content being manipulated (e.g., image, video, audio file, word-processing document, spreadsheet) is opened, and another example stopping point is when the content being manipulated is closed. Further still, a starting point may correspond to a time when a user starts interacting with an application after a period of inactivity and a stopping point may correspond to a last tool used or action performed before a next period of inactivity with the application. It should be appreciated that a variety of different starting and stopping points may be used to define a session of user interaction with an application without departing from the spirit or scope of the techniques described herein.

As used herein, the term "clickstream data" refers to data that represents a recording of parts of a screen on which a user clicks (e.g., with a mouse cursor or taps with a finger or stylus) while using a software application. Generally, as the user clicks (or taps) anywhere on a user interface of the application, the action is logged, e.g., in an application log than can be maintained in storage and communicated over a network.

As used herein, the term human-readable (natural) language refers to human languages such as English.

As used herein, a "document" generally refers to a list of natural language words indicative of tools selected by a user and actions performed by the user with an application during a single session of interaction.

The described techniques are generally discussed with reference to "TFIDF," an acronym for "term frequency-inverse document frequency," which is a numerical statistic that reflects how important a word is to a document in a collection of documents or corpus. A TFIDF value increases proportionally to the number of times a word appears in the document, but is offset by the frequency of the word in the corpus, which adjusts for the fact that some words appear more frequently in general. In the context of the described techniques, TFIDF values increase proportionally to the number of times a word representative of a tool or action appears in a document generated for a session, but is offset by the frequency of the word across the collection of documents generated for the entirety of application usage data collected from existing application users. This way, tools which may be used more frequently and in connection with most tasks, such as copy, paste, and zoom, are given a value indicative of less importance than tools used less frequently overall.

The described techniques are also discussed with reference to "LDA," which is an acronym that stands for Latent Diricklet allocation. In general, LDA is a generative statistical model used in natural language processing that allows sets of observations to be explained by unobserved groups that explain why some parts of the data are similar. By way of example, if observations are words collected into documents, LDA assumes that each document is a mixture of topics and that each word's use is attributable to one of the document's topics. It follows then that in the context of tool usage, LDA assumes that each session document is a mixture of tasks and that each word's use (the use of each tool and performance of each action) is attributable to one of the session's tasks.

As used herein, a "task" refers to a group of actions performed in an application by utilizing multiple tools of the application to obtain some modification to data or combination of modifications. In connection with a drawing application, for instance, one "task" may correspond to an image importing task, which generally can include selecting to import an image (e.g., a .jpeg file) into a drawing, positioning the image within the drawing, cropping the image, scaling the image, and in some cases blending the image to match other content already in the drawing. It is to be appreciated that after importing the image, the positioning, cropping, scaling, and blending may be carried out in a variety of different orders to achieve a same modification to the drawing. Accordingly, the actions performed and tools utilized generally in connection with a task are unordered. Additionally, tasks for an application are determined based on the application usage data collected from expert users. This data is processed as described in more detail below to extract groups of actions and tools commonly used together to obtain a given modification. Tasks, therefore, are application-specific, and may correspond to a variety of different tools and actions carried out with those tools without departing from the sprit or scope of the techniques described herein.

The described techniques are also discussed with reference to "Word2vec," which is a semantic clustering technique that uses a group of models configured to produce word embeddings, such as to cluster tool words like "line tool," "curvature tool," "rectangle shape," and "ellipse shape". The models used in the Word2Vec approach are configured as shallow, two-layer neural networks trained to reconstruct linguistic contexts of words In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ application tool recommendations described herein. The illustrated environment 100 includes a service provider system 102, client device 104, recommender generation system 106, and sources 108 of application usage data 110 that are communicatively coupled, one to another, via a network 112.

Computing devices that are usable to implement the service provider system 102, client device 104, recommender generation system 106, and sources 108 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 7.

The service provider system 102 is illustrated as including a service manager module 114 that is representative of functionality to provide services accessible via the network 112 that are usable to make products or services available to consumers. The service manager module 114, for instance, may expose updates, content, or functionality that is accessible via the network 112 by an application 116 of the client device 104. The application 116 may be configured in a variety of ways, e.g., it may be configured as a drawing application, image-editing application, audio-file editing application, video editing application, animation application, image organizing application, word processing application, spreadsheet application, network-enabled application, and so on that obtains data from the service provider system 102 via the network 112. This data can be employed by the application 116 to enable a user of the client device 104 to communicate with the service provider system 102 to perform a variety of actions in connection with the service provider system 102, such as to download content (e.g., fonts, stock images, stock videos, and so on) when the service provider system 102 maintains content for distribution.

In order to deliver recommendations for application tools, the application 116 includes recommendation engine 118. In general, the recommendation engine 118 represents functionality to predict a next task that a user of the client device 104 is going to perform using the application 116. The recommendation engine 118 is also capable of causing one or more recommendations related to the predicted next task to be presented via a user interface associated with the application 116. By way of example, the recommendations may recommend tools for carrying out the next predicted task, include content (e.g., video or text descriptions) indicating how to use tools of the application 116 for certain tasks, and so forth. The recommendations may also show a user how to access tools via graphical user interface components of the application 116, e.g., by showing the user or otherwise describing to the user which menus, panels, dialog boxes, buttons, and so on to select to access the tools.

To predict a next task, the recommendation engine 118 leverages a history of tasks performed by the user. For instance, if a user has imported an image into a drawing application, the recommendation engine 118 may predict that the user is likely to next crop the imported image. Based on this prediction, the recommendation engine 118 presents recommendations regarding cropping (and related) tools to the user, such as recommendations that indicate how to access the cropping tools, tips for using the cropping tools efficiently, and so on. In general, the task history describes the tasks a user has performed during a current interaction session with an application, and is based on the tools used and actions performed during the session.

In order to generate recommendation engines, the service provider system 102 may employ a recommender generation system 106. Although functionality of the recommender generation system 106 is illustrated as separate from the service provider system 102, this functionality may also be incorporated as part of the service provider system 102, further divided among other entities, and so forth. The recommender generation system 106 includes a task prediction manager module 120 that is implemented at least partially in hardware of a computing device to provide recommendation engines 122, which are illustrated stored in storage 124. The recommendation engine 118, for instance, may correspond to one of the recommendation engines 122 generated by the task prediction manager module 120—it may be generated by the task prediction manager module 120 to deliver application tool recommendations specifically for the application 116.

Like the recommendation engine 118, the recommendation engines 122 represent functionality to predict a next task an application user will perform with an application and cause recommendations that relate to the predicted task to be presented. The task prediction manager module 120 may generate the recommendation engines 122 based on application-task prediction models 126 and recommendation content 128. The task prediction manager module 120 also represents functionality to build the application-task prediction models 126 from the application usage data 110.

In general, each of the application-task prediction models 126 is built from the application usage data 110 that is collected specifically for the application to which the model corresponds. By way of example, an application-task prediction model 126 capable of predicting tasks for users of a particular image editing application is built from the application usage data 110 collected from existing users of that particular image editing application. In this way, the application-task prediction models 126 may be built on a per-application basis, such that one model corresponds to one application or a model corresponds to part of one application.

The application usage data 110 used for building the application-task prediction models 126 may be collected from application logs of corresponding applications. Additionally, the application usage data 110 may describe user interaction in terms of selections made by users relative to user interface components of an application. In one or more implementations, the application usage data 110 is clickstream data, which refers to data that records regions of a screen a user clicks on while using a software application. In connection with interfaces that allow other types of interaction, such as voice- or gaze-based user interfaces, the application usage data 110 may be configured differently. In any case, the application usage data 110 is capable of indicating the tools application users use, actions performed with the tools, orders in which the users use tools, a result of tool usage on content being manipulated (e.g. on an image file, audio file, video file, word-processing document, or spreadsheet), and so on.

In addition, the application usage data 110 may be collected solely from "expert" users. An "expert" user may be self-defined, such as when the user designates an "expert" or "beginner" status in connection with installing an application. A user may be defined as an expert in other ways without departing from the spirit or scope of the techniques described herein. By way of example, the application usage data 110 may indicate usage patterns associated with expert users, e.g., an order in which tools are used may be indicative of an expert user, the use of tools in connection with certain tasks may be indicative of an expert user, and so on. Accordingly, a user may be designated as an "expert" user by the task prediction manager module 120 when their application usage data includes patterns associated with expert users. By using application usage data 110 collected from expert users, the recommendation engines 122 can recommend tools and actions in scenarios where expert users would use the tools and perform the actions. In this way, the recommendation engines 122 may teach beginner users how to use applications like expert users. Consequently, users of applications that employ the described techniques may become proficient with those applications more quickly than other applications.

To build the application-task prediction models 126, the task prediction manager module 120 is configured to initially convert the application usage data 110 into human (natural) language. For example, application usage data 110 configured as clickstream data that indicates user selection of an interface button to position an object being modified behind other objects being modified may be converted to the text 'send_back'. Accordingly, the application usage data 110 may be converted into lists of natural-language words that correspond to tools selected and actions performed by users within applications. The task prediction manager module 120 is also configured to generate documents for each session of user interaction with an application, where the documents comprise a list of natural language words that are indicative of the tools selected and actions performed by a user with the application during the session.

Given documents for a large number of sessions, the task prediction manager module 120 can leverage natural language processing techniques-capable of indicating an importance of words and groups of words in a body of text—to determine an importance of the natural language words in these documents. In one or more embodiments, the task prediction manager module 120 computes an importance of the words using term frequency-inverse document frequency (TFIDF). In so doing, the task prediction manager module 120 computes an importance of the tools used and actions performed during the user interaction sessions according to the natural language processing techniques.

In addition to determining an importance of the different words, and thus application tools and actions, the task prediction manager module 120 also groups related tools and actions, e.g., in a drawing application, an ellipse- and rectangle-creation tool may be determined related. Based on the determined importance of the tools and actions as well as the determined related tools and actions, the task prediction manager module 120 may define tasks, such that a task is a group of tools and actions observed in the application usage data 110. The task prediction manager module 120 is also capable of building the application-task prediction models 126, e.g., for predicting a user's next task with an application.

Each task may be associated with recommendation content 128, which represents content application user interfaces can be configured with to present recommendations regarding application tools. By way of example, the recommendation content 128 may correspond to tool recommendations, e.g., the recommendations may show or otherwise indicate tools of an application the user can use to perform a predicted next task. The recommendation content 128 may also correspond to recommendations for how to use tools, e.g., written or video instructions indicating how to use tools of the application to perform the predicted next task. Thus, when a next task is predicted using an application-task prediction model 126, the corresponding recommendation content 128 can be retrieved, and a user interface (e.g., of the application 116) configured to present the recommendations. In this way, a user may learn about tools an application has and actions the user can perform with the tools in situations where expert users use the tools. Furthermore, the recommendations are presented without the user initiating a search. This can alleviate the burden of having to think of search terms for finding an appropriate tool to carry out a desired task. In connection with content-creation applications, this allows users to expend their energy creating content rather than spend it figuring out how to achieve some result relative to a portion of the content.

Having considered an example environment, consider now a discussion of some example details of the techniques for application tool recommendations in accordance with one or more implementations.

Recommendation Engine Generation and Use

Figure 2:
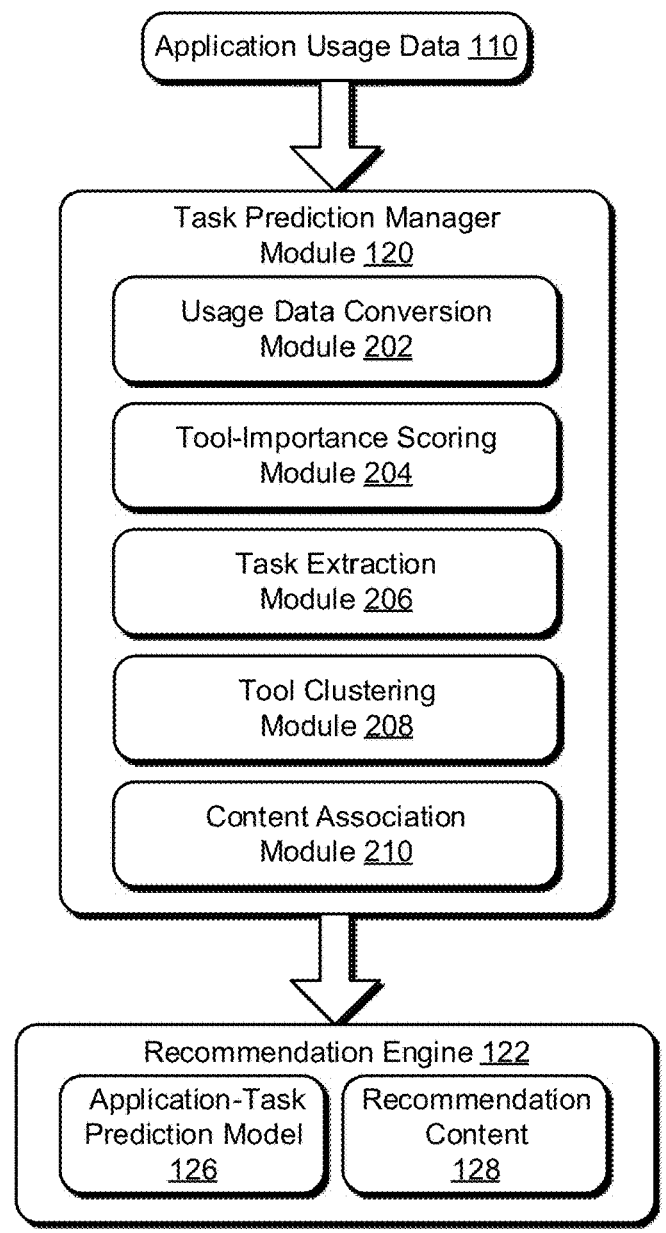
FIG. 2 depicts an example implementation in which a recommender generation system of FIG. 1 uses application usage data of existing application users to generate a recommendation engine for delivering recommendations for application tools.
Figure 3:
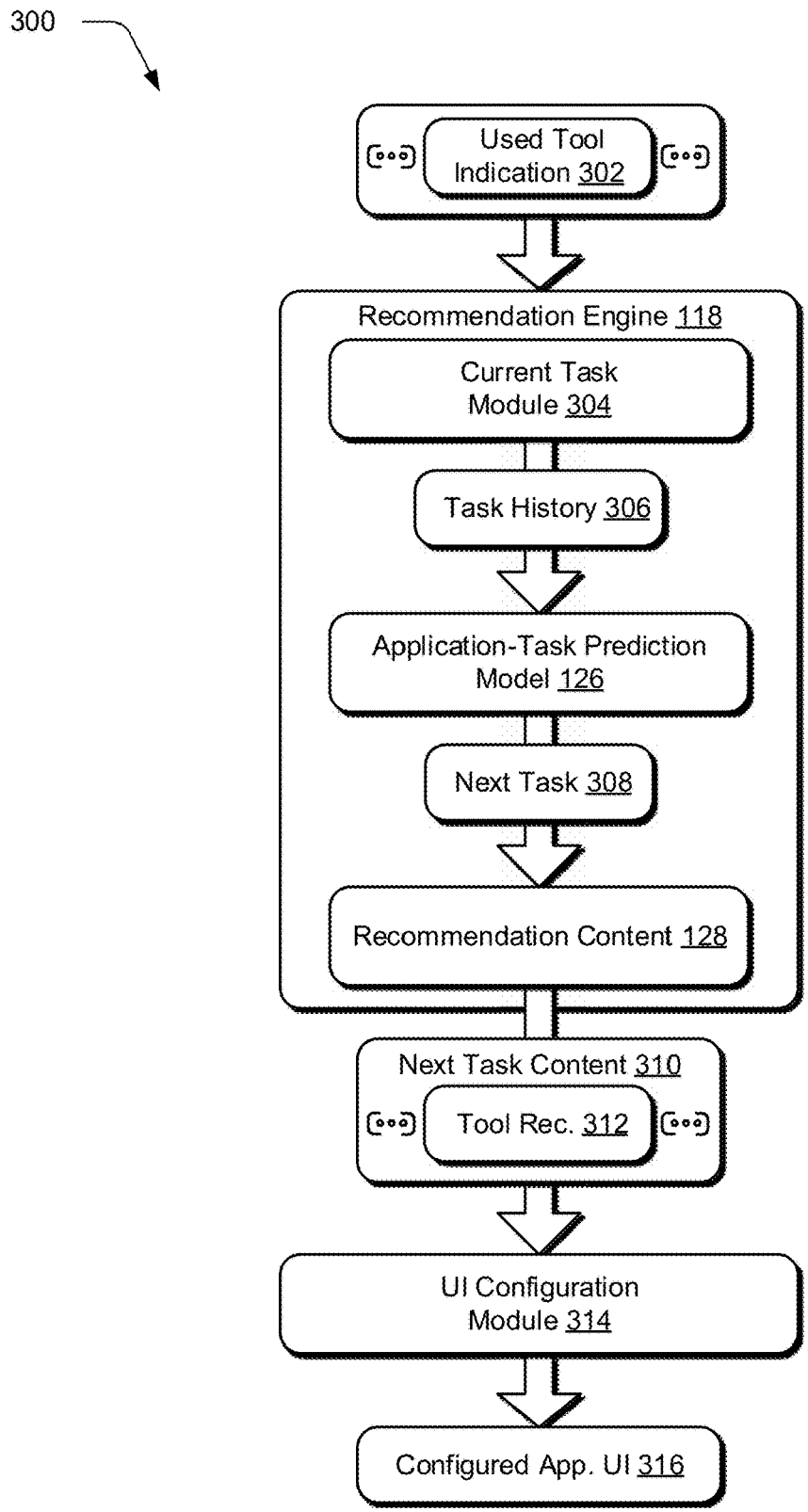
FIG. 3 depicts an example implementation in which a recommendation engine of FIG. 1 predicts a next task a user will perform with the application and makes application tool recommendations for the next task.
Figure 4:
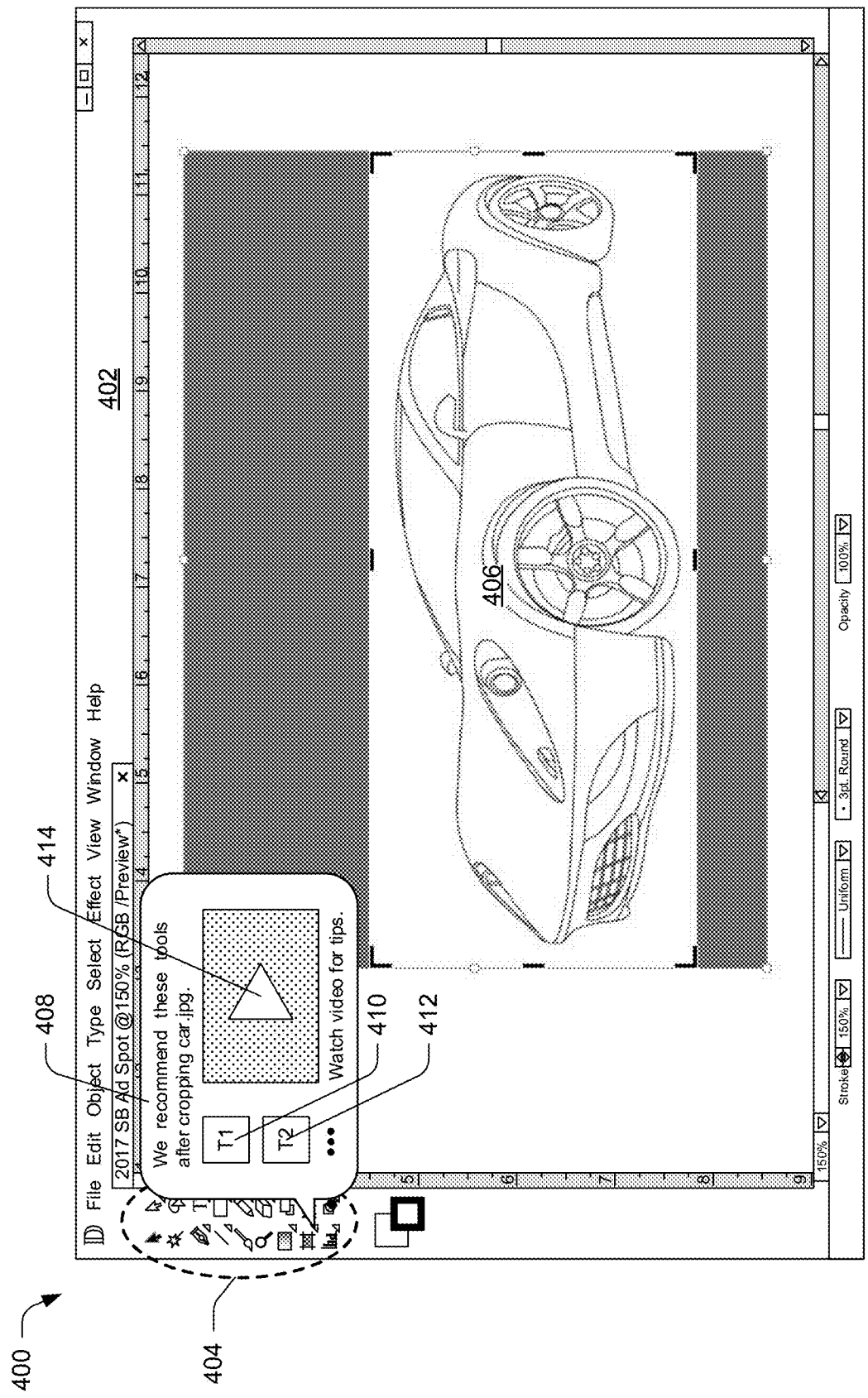
FIG. 4 depicts an example user interface configured to present recommendations to a user based on a predicted next task.

FIG. 2 depicts a system 200 in an example implementation in which the recommender generation system 106 of FIG. 1 uses application usage data of existing application users to generate a recommendation engine for delivering recommendations for application tools. FIG. 3 depicts an example implementation in which a recommendation engine of FIG. 1 predicts a next task an application user will perform and makes application tool recommendations for the next task. FIG. 4 depicts an example user interface configured to present recommendations to a user based on a predicted next task.

The illustrated system 200 is depicted with the task prediction manager module 120 of the recommender generation system 106 of FIG. 1. In this example, the task prediction manager module 120 includes usage data conversion module 202, tool-importance scoring module 204, task extraction module 206, tool clustering module 208, and content association module 210. In general, the usage data conversion module 202, the tool-importance scoring module 204, the task extraction module 206, and the tool clustering module 208 represent functionality of the task prediction manager module 120 to generate the application-task prediction models 126 from the application usage data 110. The content association module 210 represents, generally, functionality to associate the recommendation content 128 to different tasks that are performable by application uses, such that when a task is predicted the recommendation content 128 associated with the task can be retrieved and presented.

The task prediction manager module 120 is shown obtaining the application usage data 110 as input. As described above, the application usage data 110 describes user interactions with applications, such as selections made by users relative to user interface components of an application. As also noted above, the application data 110 may be configured as clickstream data in accordance with one or more implementations. Regardless of the format, the usage data conversion module 202 represents functionality to convert the application usage data 110 to human-readable (natural) language.

By way of example, the usage data conversion module 202 converts application usage data 110 indicative of a selected tool to a word or group of words (e.g., a bi-gram or tri-gram) indicative of the tool. For instance, the usage data conversion module 202 can convert clickstream data indicating a button was selected for sending an object behind other objects to the text 'send_back'. Each time the usage data conversion module 202 encounters the application data 110 indicative of a particular tool or indicative of a particular action performed, the usage data conversion module 202 converts that data to a same word or same group of words associated with the particular tool or action.

In addition to converting the application usage data 110 into words, the usage data conversion module 202 represents functionality to generate a document for each session of interaction with an application. An individual document is digital content comprising a list of words indicative of the tools used and activities performed by a user during a single session of interaction with a particular application. As mentioned above, a session may be defined in a variety of different ways without departing from the spirit or scope of the techniques described herein, such as beginning when a user launches the particular application and ending when the user exits the application. Accordingly, when multiple users interact with a particular application over many different sessions, the usage data conversion module 202 may generate a large number of documents having words indicative of the tools used and actions performed with the particular application.

By converting application selections to natural words, the task prediction manager module 120 can leverage a variety of natural language processing techniques for computing different measures, such as measures for determining topics of written content (e.g., articles, papers, online posts), categorizing written content, and so forth. With respect to the illustrated system 200, the tool-importance scoring module 204 represents functionality to compute importance scores for tools used during a session by applying at least one natural language processing technique. In particular, the tool-importance scoring module 204 is configured to apply natural language processing to the documents generated for a respective application. In one or more implementations, the tool-importance scoring module 204 computes TFIDF for the words listed in a document of a particular session. The tool-importance scoring module 204 may do so relative to the entire collection of documents generated for a respective application or some number of those documents.

In implementations involving TFIDF, the TFIDF values increase proportionally to a number of times a word representative of a tool appears in a single document, but is offset by the frequency of the word across the entire collection of documents generated for the application. This way tools which may be used more frequently in connection with many tasks are given a value indicative of less importance than tools used less frequently overall. In implementations involving TFIDF, the tool-importance scoring module 204 computes the importance scores for the tools used during each session as TFIDF-vector representations of a session, where the TFIDF vectors indicate the importance of the tools used in the session according to TFIDF. In addition or alternately, the tool-importance scoring module 204 may compute importance scores according to different techniques without departing from the spirit or scope of the techniques described herein.

Broadly speaking, the task extraction module 206 represents functionality to determine tasks performed with an application based on the importance scores. As mentioned above, "tasks" correspond to unordered groups of tools used and actions performed together that are observed across user sessions to accomplish some modification within an application. To determine tasks, the task extraction module 206 can extract tasks from data indicative of the user interaction sessions and based on the computed importance scores. In implementations where TFIDF is used, the task extraction module 206 is configured to extract tasks from the TFIDF vectors that are computed for multiple interaction sessions. The task extraction module 206 may leverage one or more additional natural language processing techniques to determine the tasks.

In one or more implementations, the task extraction module 206 may use Latent Diricklet allocation (LDA) to determine tasks that are associated with an application based on the importance scores. In general, LDA is a generative statistical model used in natural language processing that allows sets of observations to be explained by unobserved groups that explain why some parts of the data are similar. By way of example, if observations are words collected into documents, LDA assumes that each document is a mixture of topics and that each word's use is attributable to one of the document's topics. It follows then that in the context of tool usage, LDA assumes that each session document is a mixture of tasks and that each word's use (the use of each tool and performance of each action) is attributable to one of the session's tasks. Accordingly, the task extraction module 206 is configured to generate an LDA model based on the importance scores.

Further, the task extraction module 206 may determine tasks on a per session basis, such as by assigning multiple tasks to a document and therefore a corresponding session. In implementations where LDA is used, the task extraction module 206 may assign tasks to a document by generating an LDA model in association with TFIDF vectors and using the LDA model to compute latent values. In accordance with such implementations, the task extraction module 206 may also be configured to determine an optimal number of tasks for a session, e.g., based on a perplexity of a generated LDA model. As noted above, tasks correspond to unordered groups of tools and user actions. The task extraction module 206 is also configured to form a list of words to represent a task, where the words in the list correspond (as determined by the usage data conversion module 202) to the tools used and actions performed as part of the task.

From the extracted tasks, the task extraction module 206 is configured to ascertain the words that are unique to a particular task, and thus the corresponding tools and actions that are unique to the task. Consider again an example drawing application in accordance with one or more embodiments. Users of the drawing application may use cut and paste tools frequently and in connection with a large variety of different tasks. Such commonly used tools, and the actions performed with them, are not considered "unique" to a given task because they are used in connection with many different tasks. In contrast, tools and operations that are not used frequently in connection with many tasks may be considered "unique," when observed as part of a task. The task extraction module 206 may further ascertain whether a word is unique to a task based, in part, on a computed probability of the word being present when the task is observed, e.g., the tools and actions having a high probability of being present with a particular task but not with a large number of other tasks.

The tool clustering module 208 is configured to generalize the tasks to make the tasks applicable to a greater number of application usage scenarios. To generalize the tasks, the tool clustering module 208 is configured to replace some tools or actions present in the tasks with a tool- or action-category corresponding to the tool or action, where categories are each associated with a group of tools or group of actions. In the context of a drawing application, for instance, the tool clustering module 208 may determine to cluster a "line tool," "curvature tool," "rectangle shape," and "ellipse shape" into a basic shape tools category—specified in text as "basic_shapes_category" for example. Accordingly, when the tool clustering module 208 encounters the corresponding word for one of the "line tool," "curvature tool," "rectangle shape," or "ellipse shape" in a task, the tool clustering module 208 replaces the encountered tool with "basic_shapes_category." In this way, groups of tools and actions configured to produce similar or related modifications are clustered. It should further be appreciated that the above is merely an example clustering of tools. The described techniques may cluster tools differently, and form a variety of different clusters, than the example clustering without departing from the spirit or scope of the techniques described herein.

To determine which tools and actions of an application to group into a cluster, the tool clustering module 208 may utilize a variety of different techniques. By way of example, the tool clustering module 208 may leverage techniques that account for a probability of a tool or action belonging to a particular task, e.g., as indicated by an LDA model. In at least some implementations, the tool clustering module 208 generalizes tasks determined by the task extraction module 206, $T_i$, using tool clusters $V_i$ determined for the application as follows:

$$T_i=\{t_1,t_2,t_3\ldots\}\rightarrow V_i=\{v_1,v_2\ldots v_m\}\forall i\in[1,n]$$

The terms $t_1$, $t_2$, $t_3$ each represent different tools or actions utilized in connection with task $T_i$. The term n represents a number of tasks and the term m represents a number of tool clusters determined for the application. Accordingly, each of $v_1, v_2, \ldots v_m$ represents a tool or action cluster. Given this, the tool clustering module 208 may determine a given tool cluster $v_j$ according to the following:

$$v_j \propto \Sigma_{k\in K_j} P(t_k, T_i)$$

Here, the term $P(t_k, T_i)$ represents the probability of the tool k ($t_k$) in the task i ($T_i$). Additionally, the term $K_i$ is the number of tools in the task i, such that $K_i = (p|t_p \in T_i)$. The set of generalized tasks TV that a user may perform in connection with an application can thus be represented as follows:

$$TV=\{(V_1,V_2,V_3\ldots V_n\},$$

The terms $V_1, V_2, V_3 \ldots V_n$ each represent a generalized task, e.g., a list of human readable words where words corresponding to the tools and actions specified for an initially determined task are replaced with a corresponding category word. Again, the term n corresponds to the number of tasks determined by the task extraction module 206.

In implementations, the task prediction manager module 120 is configured to generate the application-task prediction models 126 based on the generalized tasks. The application-task prediction models 126 generated in this way are capable of being used to compute a probability that a user transitions from any of the tasks determined for an application to any other task determined for the application.

In addition to predicting a next task, the recommendation engines 122 are also configured to cause the recommendation content 128 corresponding to the predicted task to be presented to a user. The content association module 210 represents functionality to associate a generalized task with at least a portion of the recommendation content 128. Accordingly, when an application-task prediction model 126 predicts that one of the generalized tasks is most probable to be next performed, the associated content—as determined by the content association module 210—can be retrieved and presented. The content association module 210 may memorialize the associations by creating a table that maps the generalized tasks to the associated portions of the recommendation content 128. Accordingly, when a task is predicted by a client device, it may reference the table to retrieve the appropriate content. The associations may be configured to enable retrieval and presentation of the associated recommendation content 128 in a variety of different ways without departing from the spirit or scope of the techniques described herein. Additionally, the recommendation content 128 may be configured in a variety of different manners as discussed in relation to FIG. 4.

FIG. 2 also depicts one of the recommendation engines 122, which includes an application-task prediction model 126 and recommendation content 128. In accordance with the described techniques, the recommendation engine 122 is application specific, such that the application-task prediction model 126 and recommendation content 128 with which the recommendation engine 122 is configured enable task prediction and recommendation presentation for a specific application. Accordingly, the task prediction manager module 120 generates each of the recommendation engines 122 for a specific application. The recommendation engine 122 may thus be delivered to an application developer (e.g., over the network 112) for incorporation as part of the corresponding application. Alternately, the recommendation engine 122 may be delivered to a client device over the network 112 as an update or to otherwise supplement the corresponding application.

Regardless of a manner in which provided for use, the recommendation engines 122 are used to predict a user's next task with an application and present recommendations to assist with the predicted task. FIG. 3 depicts an example implementation 300 in which a recommendation engine of FIG. 1 predicts a next task a user will perform with an application. The illustrated example 300 includes the recommendation engine 118, which represents that the described task prediction may be performed in relation to a session of interaction with the application 116 at the client device 104.

The illustrated example 300 also includes used tool indication 302, which is illustrated with ellipses to indicate one or more used tool indications. As a user utilizes tools of the application 116 and performs actions with the tools during a session, the used tool indications 302 are provided as input to the recommendation engine 118. When a user uses a first tool or performs a first action during an interaction session, for example, a first indication representative of the tool or action is provided to the recommendation engine 118. It follows then that when the user uses a second tool or performs a second action, a second indication representative of the used tool or performed action is provided. Subsequently, a third indication is provided, and so forth. The recommendation engine 118 may thus obtain a list of tools used and actions performed by a user in connection with the application 116.

The recommendation engine 122 is illustrated with current task module 304, which represents functionality to ascertain which of the tasks defined by the task extraction module 206 are observed in the used tool indications 302. The current task module 304 generates task history 306 based on the determination. The task history 306 represents a list of the tasks determined for some predetermined number of tool indications. Consider an example in which the recommendation engine 118 obtains used tool indications $t_1$-$t_{11}$ as follows:

$t_1$ $t_2$ $t_3$ $t_4$ $t_5$ $t_6$ $t_7$ $t_8$ $t_9$ $t_{10}$ $t_{11}$ ...

In this example, the current task module 304 may iterate over the obtained indications and determine that tool indications $t_1$-$t_5$ correspond to a task defined by the task extraction module 206 as $T_3$, tool indications $t_4$-$t_8$ correspond to a different task defined by the task extraction module 206 as $T_6$, and tool indications $t_8$-$t_{11}$ correspond to a task defined by the task extraction module 206 as $T_5$. Accordingly, the current task module 304 may map the used tool indications to the tasks as follows:

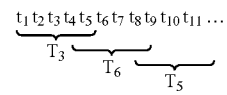

The current task module 304 may determine the tasks that obtained tool indications correspond to by computing similarity scores relative to the tasks defined by the task extraction module 206. Initially, the current task module 304 may determine the tasks by iterating over the used tool indications 302 using a sliding window of fixed length, e.g., the last 15 tasks. In this way, the last predetermined number of tools used and actions performed are considered, enabling the prediction of a next task to be based on an actual current workflow. The length of the window may correspond to a different number of tools used and actions performed without departing from the spirit or scope of the techniques described herein. In any case, the current task module 304 determines tasks for the obtained tool indications in the sliding window each time a new tool is used or new action is taken. In other words, the current task module 304 may produce the task history 306 each time a new tool is used or new action is taken.

As part of determining which of the extracted tasks to assign to the tool indications in the sliding window, the current task module 304 may generate one or more vector representations indicative of the tool indications within the sliding window. The current task module 304 is then capable of comparing the vectors representative of the tool indications in the sliding window to vectors generated to represent the generalized tasks extracted by the task extraction module 206. The current task module 304 may compare the sliding-window vectors to the extracted-task vectors to compute a similarity score between the sliding-window vectors and the extracted-task vectors.

In one or more implementations, the current task module 304 determines this similarity using cosine similarity. In particular, an inverse document frequency-weighted (IDF-weighted) cosine similarity may be used. By using an IDF-weighted cosine similarity, the tools and actions used frequently in connection with many tasks (e.g., cut, paste, zoom) may be given less relevance when matching the sliding-window vectors to the extracted-task vectors. In implementations, the recommendation engine 118 may compute the similarity between the tools in the sliding window and the extracted tasks according to the following:

$$\text{similarity} = \cos(V_i, SW) = \frac{\sum_{i=1}^{m} w_i \times v_i \times sw_i}{\sqrt{\sum_{i=1}^{m} (v_i)^2} \times \sqrt{\sum_{i=1}^{m} (sw_i)^2}}$$

Here, the term $V_i$ represents a given generalized task (e.g., where tools and actions have been replaced with corresponding categories) and the term SW represents the sliding window of used tool indications. Further, the term $w_i$ represents a weight (e.g., an IDF-score) associated with a given tool or action $sw_i$ of the sliding window SW. The term $v_1$ represents a given tool or action cluster and the term m represents a number of clusters. In one or more implementations, the current task module 304 is configured to compute the weight as follows:

$$w_i \propto \frac{\sum_{j=1}^{t} \text{idf\_score}_j}{m}$$

In this expression, the term t represents a number of tools in cluster i. The current task module 304 module may compute similarity scores other than cosine similarity to determine which of the generalized tasks correspond to the used tool indications 302 in the sliding window of a current session without departing from the spirit or scope of the technique described herein.

The current task module 304 may also be configured to determine a probability an application user will transition from each of the tasks to each other task. In one or more implementations, the current task module 304 determines the probability an application user will transition between tasks based on a task model configured as a probability matrix, where each cell of the matrix corresponds to a probability of the user transitioning from one task to another. By way of example, a task transition matrix TTM may be constructed according to the following:

$$TTM = [p_{ij}]_{n \times n}$$

The term $p_{ij}$ represents the probability that a user transitions between task i and task j. In one or more implementations, the probability $p_{ij}$ is determinable using the application-task prediction model 126. The current task module 304 may also be configured to row-normalize the task transition matrix. Using the similarity scores computed between the used tool indications of the sliding window and the generalized tasks as well as the probabilities of transitioning between the tasks, the current task module 304 selects one or more of the generalized tasks to represent the tool indications of the sliding window. In the example discussed above, the current task module 304 selects $T_3$, $T_6$, $T_5$ to represent the tool indications $t_1$-$t_{11}$. The current task module 304 generates the task history 306 to represent these determined tasks.

Given the task history 306, the recommendation engine 118 uses the application-task prediction model 126 to predict next task 308. In particular, the recommendation engine 118 uses the application-task prediction model 126 to compute probabilities of the tasks extracted by the task extraction module 206 being performed next during the current user session based on the task history 306. The recommendation engine 118 identifies the task having the highest probability of being performed next as the next task 308 for the session.

Based on the next task 308, next task content 310 is presented to the user. To present the next task content 310, the recommendation engine 118 determines which of the recommendation content 128 corresponds to the next task 308. As noted above, associations between the recommendation content 128 and tasks may be recorded in a table. In such implementations, the recommendation engine 118 may determine which of the recommendation content 128 is associated with the next task by referencing the table. Regardless of how the recommendation engine 118 determines that the next task content 310 is associated with the next task 308, the recommendation engine 118 can retrieve the next task content 310. In one or more implementations, the recommendation content 128 may be stored locally, e.g., at the client device 104 where the application 116 is used by a user. Accordingly, the recommendation engine 118 may retrieve the next task content 310 from local storage of the client device 104. In addition or alternately, the recommendation content 128 may be stored remotely from the client device 104, e.g. by the recommender generation system 106, some other service provider system 102, another device associated with a user of the client device 104, and so forth. The recommendation engine 118 may thus also be configured to retrieve the next task content 310 from storage locations remote to the client device 104.

The next task content 310 is depicted with tool recommendation 312. The tool recommendation 312 represents content that is presentable via a user interface of the application 116 to provide a recommendation for a tool of the application 116. The tool recommendation 312 is configured to help the user with the next task 308. As mentioned above, the tool recommendation 312 may be configured in a variety of different ways. By way of example, the tool recommendation 312 may be configured as text that describes a how to select a particular tool of the application 116 that may be helpful for the next task 308, how to use a particular tool of the application 116 that may be helpful for the next task 308, and so forth. The tool recommendation 312 may also be configured as video or an animation that indicates how to select a particular tool of the application 116 that may be helpful for the next task 308, how to use a particular tool of the application 116 that may be helpful for the next task 308, and so forth. An animation, for instance, may visually indicate via a user interface of the application 116 components of the user interface that can be selected to access the particular tool. The tool recommendation 312 may also be configured to enable selection of a recommended tool, e.g., such as an overlay that includes a button to select the recommended tool. The next task content 310 is illustrated with ellipses to indicate that a combination of multiple different tool recommendations 312 may be presented in connection with the next task 308. For instance, an overlay with text describing one or more recommended tools of the application 116 may be presented along with an animation that shows a user how to navigate through the application 116's user interface to select the recommended tools.

The illustrated example 300 also includes user interface configuration module 314 (UI configuration module 314). In one or more implementations, the UI configuration module 314 is incorporated as part of the application 116. Alternately or in addition, the UI configuration module 314 may be part of an operating system of the client device 104. Regardless, the UI configuration module 314 represents functionality to configure the application 116's user interface to present the next task content 310. Configured application user interface 316 (configured application UI 316) represents digital content comprising the application 116's user interface configured with the next task content 310, e.g., to present the tool recommendations 312 to a user of the client device 104.

FIG. 4 illustrates an example 400 of a user interface configured to present tool recommendations to a user based on a predicted next task. The illustrated example 400 includes graphical user interface 402, which is depicted having a variety of tools 404 that are selectable to perform a variety of different actions with respect to content 406. The graphical user interface 402 may be a user interface of the application 116, for example.

The illustrated example 400 also includes tool recommendation 408, which is illustrated as an overlay that overlays the graphical user interface 402. Although illustrated as an overlay, the tool recommendation 408 may be configured in a variety of different ways without departing from the spirit or scope of the techniques described herein. As mentioned above, for instance, tool recommendations may be configured as animations. In some implementations, tool recommendations may be configured as audio content output to a user of the client device 104 via one or more speakers.

Nonetheless, in the illustrated example the tool recommendation 408 includes tool selections 410, 412 and video 414. The tool selections 410, 412 may be selectable to initiate use of a corresponding tool. Alternately or in addition, the tool selections 410, 412 may be selectable to initiate an animation that shows a user how to access the corresponding tool via the graphical user interface 402. The video 414 may be selectable for playback and may instruct a user how to use a recommended tool, teach a user what actions can be performed with a recommended tool, show a user how to access a recommended tool via the graphical user interface 402, and so forth. In one or more implementations, the video 414 may simply be played back in the overlay. Alternately or in addition, selection of the video 414 may launch a media player to play the video 414, expand the video 414 beyond the boundaries of the overlay, and so forth. Further, selection of the video 414 may cause video controls (e.g., pause, stop, fast forward, rewind, cast to a different device, etc.) to be displayed to enable a user to control playback of the video.

Although the illustrated example depicts a tool recommendation being displayed in a graphical user interface, both the tool recommendations and user interface of the application may be configured differently without departing from the spirit or scope of the techniques described herein. By way of example, a user interface to an application may be voice-based, such that interactions between a user and the client device 104 occur by way of one or more microphones and one or more speakers. In such implementations, tool recommendations may be presented audibly. Indeed, the techniques described herein may be leveraged in connection with a variety of differently configured user interfaces.

Having discussed example details of the techniques for delivering application tool recommendations, consider now some example procedures to illustrate additional aspects of the techniques.

Example Procedures

This section describes example procedures for delivering application tool recommendations in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the service provider system 102 of FIG. 1 that makes use of a recommender generation system 106 with a task prediction manager module 120 or one implemented as the example system 200 of FIG. 2, which also makes use of that module. A suitable device for performing the procedures may also be the client device 104 of FIG. 1 that makes use of a recommendation engine 118, which may be implemented as in the example 300 of FIG. 3.

Figure 5A:
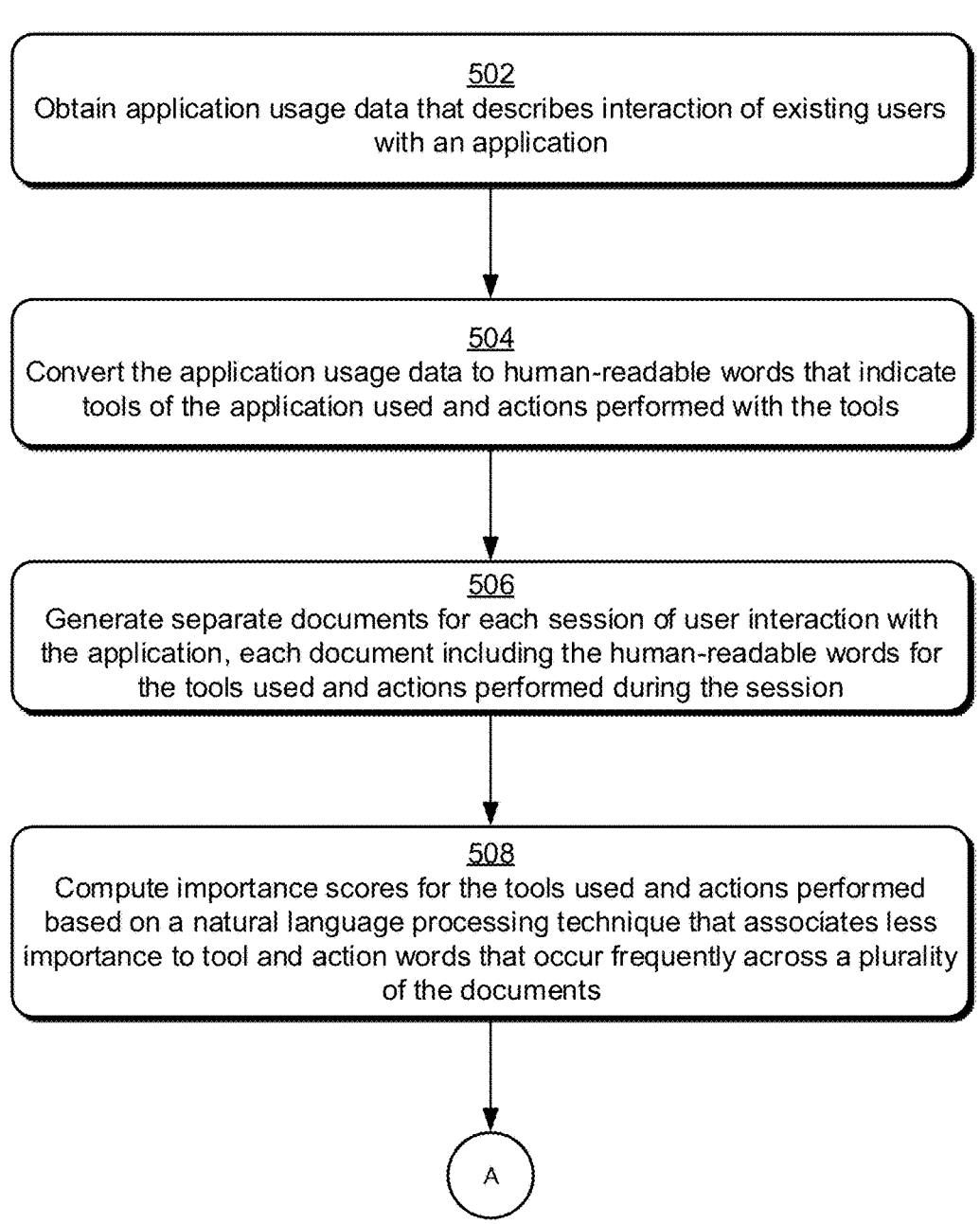
FIGS. 5A and 5B depict a procedure in an example implementation in which an application task prediction model is computed from application usage data of existing application users.
Figure 5B:
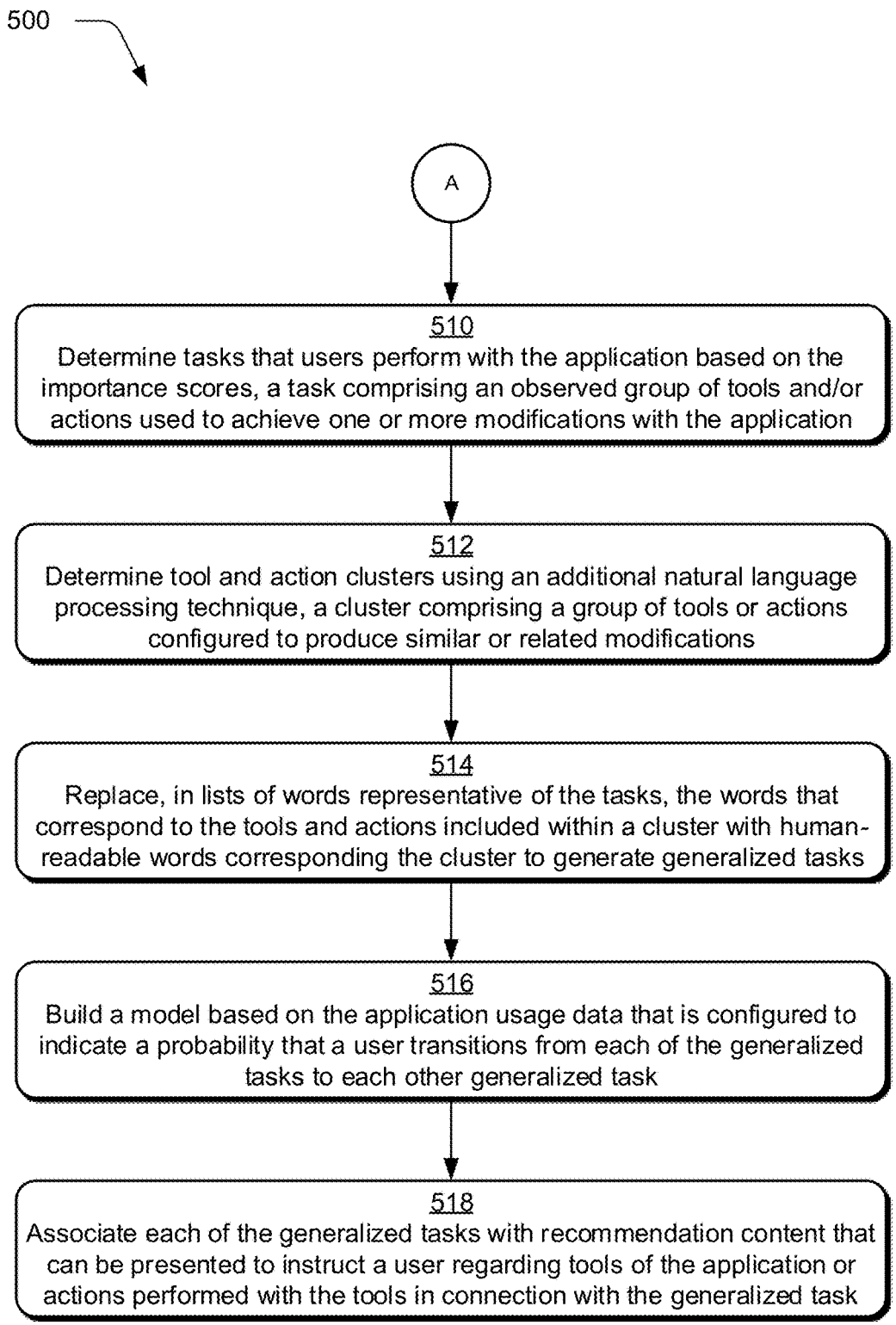

FIGS. 5A and 5B depict an example procedure 500 in which an application task prediction model is computed from application usage data of existing application users. Application usage data is obtained from existing users of an application (block 502). In accordance with the principles discussed herein, the application usage data describes interaction of the existing users with the application.

By way of example, the task prediction manager module 120 obtains the application usage data 110 from the sources 108. In particular, the task prediction manager module 120 collects the application usage data 110 from existing users of a particular application for which an application-task prediction model 126 is being computed. In one or more implementations, the task prediction manager module 120 collects the application usage data 110 from application users designated as "experts", e.g., either through self-designation or by the task prediction manager module 120 determining that the users are experts based on usage patterns. The task prediction manager module 120 may not use the application usage data 110 from users designated as non-experts or "beginners." The application usage data 110 describes the manner in which the sources 108 interact with the application under consideration. In some cases, the application usage data 110 comprises clickstream data to describe the interaction, though other types of data may be used in accordance with the described techniques.

The application usage data is converted to human-readable words that indicate tools of the application used and actions performed with the tools (block 504). By way of example, the usage data conversion module 202 converts the application usage data 110 to human-readable words that indicate the tools of the application used by the sources 108 and actions the sources 108 perform with the tools. The usage data conversion module 202 converts the application usage data 110 to the human-readable words as described in more detail above. For example, the usage data conversion module 202 converts to the text 'send_back' clickstream data indicating user selection of a button to position an object being modified behind other objects being modified.

Separate documents are generated for each session of user interaction with the application (block 506). In accordance with the principles discussed herein, each document is generated to include the human-readable words that correspond to the tools used and actions performed by a user during a single session of interaction with the application. By way of example, the usage data conversion module 202 parses the application usage data 110 to generate separate documents for each user session of interaction with the application, such that each document includes the human-readable words assigned to the tools used and the actions performed during the respective user session.

Importance scores are computed for the tools used and actions performed based on a natural language processing technique (block 508). In accordance with the principles discussed herein, the natural language processing technique used associates less importance with tools used and actions performed frequently across the documents. By way of example, the tool-importance scoring module 204 computes importance scores for each of the words in the documents generated at block 506. Computing the importance scores for each of the words in these documents is effective to compute importance scores for the tools and actions that correspond to those words. In one or more implementations, the tool-importance scoring module 204 computes the importance scores using term frequency-inverse document frequency (TFIDF). As noted above, TFIDF is a numerical statistic that reflects how important a word is to a document in a collection of documents or corpus. A TFIDF value computed for a word will increase proportionally to a number of times the word appears in a document, but is offset by the frequency of the word in the corpus (e.g., the entire group of documents considered in connection with the application). This adjusts for the fact that some words (like "the") appear more frequently—and correspondingly that some tools are used and actions performed (like cut, copy, zoom, etc.) more frequently—in general. With TFIDF-based implementations, the tool-importance scoring module 204 computes TFIDF vectors to represent the importance scores computed for each of the documents. Accordingly, the tool-importance scoring module 204 "vectorizes" the documents. The procedure 500 continues at 'A' from FIG. 5A to FIG. 5B.

Tasks that users perform with the application are determined based, at least in part, on the importance scores (block 510). In accordance with the principles discussed herein, each task comprises an observed group of tools and actions that are used to achieve one or more modifications with the application. By way of example, the task extraction module 206 determines tasks performed with the application based, in part, on the importance scores computed at block 508.

In one or more implementations, the task extraction module 206 extracts tasks based on TFIDF vectors computed for each of the documents. The task extraction module 206 may do so using Latent Diricklet allocation (LDA), which is a generative statistical model used in natural language processing that allows sets of observations to be explained by unobserved groups that explain why some parts of the data are similar. In the context of the described techniques, LDA assumes that each session document is a mixture of tasks and that each word's use (the use of each tool and performance of each action) is attributable to one of the session's tasks. In addition to determining the tasks, the task extraction module 206 generates for each task a list of words corresponding to the tools used and actions performed in connection with the task.

Tool and action clusters are determined using an additional natural language processing technique (block 512). In accordance with the principles discussed herein, a cluster comprises a group of tools or actions that are configured to produce similar or related modifications. By way of example, the tool clustering module 208 determines tool and action clusters for the tools and actions of the application under consideration. In one or more implementations, the tool clustering module 208 determines tool and action clusters by semantically clustering the words produced via conversion of the application usage data 110 and by using a group of models configured to produce word embeddings, such as Word2vec. The models used in the Word2Vec approach are configured as shallow, two-layer neural networks trained to reconstruct linguistic contexts of words. In implementations that involve semantically clustering the tool and action words according to Word2Vec, the tool clustering module 208 module generates vector representations of the tools and actions which are semantically sound. The tool clustering module 208 can then use the clusters as BAGS in a Bag of Word approach.

In lists of words representative of the determined tasks, the words that correspond to tools and actions within a cluster are replaced with human-readable words corresponding to the respective cluster (block 514). In accordance with the principles discussed herein, the words corresponding to the tools and actions within a cluster are replaced with a corresponding cluster word to generate generalized tasks. By way of example, the tool clustering module 208 replaces the words of a task list that correspond to a cluster of tools or actions. These words are replaced with human-readable words corresponding to the respective cluster. Replacing tool and action words with words for the corresponding cluster is effective to generalize the tasks so that the tasks are applicable to a wider range of usage scenarios.

A model configured to indicate a probability that a user of the application transitions from each of the generalized tasks to each other generalized task is built based on the determined tasks, the tool and action clusters, and the application usage data (block 516). By way of example, the task prediction manager module 120 generates one of the application-task prediction models 126 for the application under consideration. The task prediction manager module 120 builds the application-task prediction model 126 based on the tasks determined at block 510, the tool and action clusters determined at block 512, and the application usage data 110. The application-task prediction model 126 built is configured to indicate a probability that a user of the application under consideration transitions from each of the generalized tasks produced at block 514 to each of the other generalized tasks.

Each of the generalized tasks is associated with recommendation content that can be presented to instruct a user regarding tools of the application or actions performed with the tools in connection with the generalized task (block 518). By way of example, the content association module 210 associates each of the generalized tasks produced at block 514 with at least a portion of the recommendation content 128. In particular, a generalized task is associated with a portion of the recommendation content 128 that can be presented via an interface of the application under consideration, e.g., to instruct a user regarding tools and actions of the application that can be useful in connection with the generalized task.

The model built at block 516 and the recommendation content associated with the application (or simply data indicative of the associations) is packaged into a recommendation engine. By way of example, the task prediction manager module 120 packages the application-task prediction model 126 and the associated recommendation content 128 (or data indicative of the associations) in the recommendation engine 122.

Figure 6:
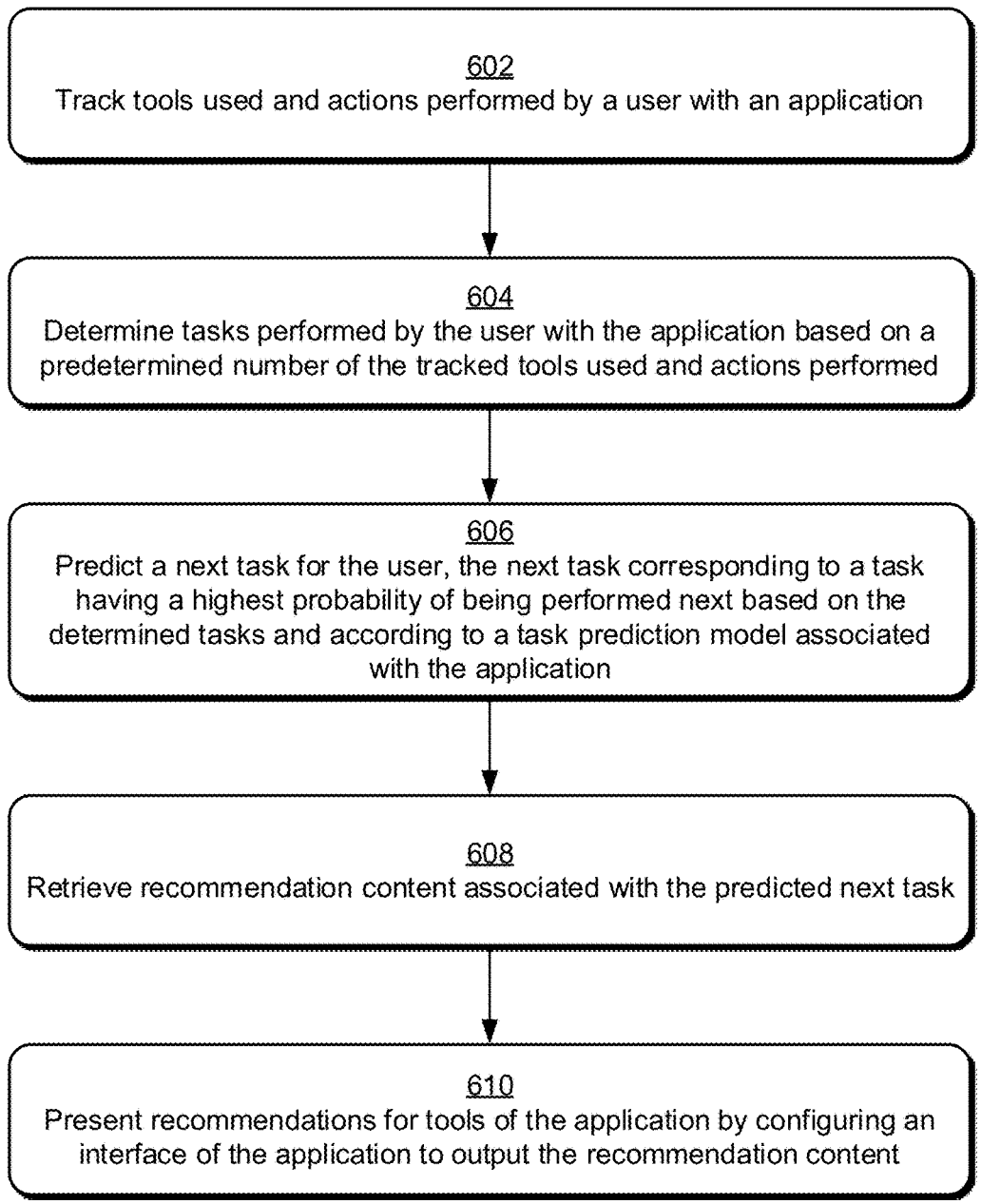
FIG. 6 depicts a procedure in an example implementation in which a next task is predicted for a user of an application and recommendations are presented based on the predicted next task.

FIG. 6 depicts an example procedure 600 in which a next task is predicted for a user of an application and recommendations are presented based on the predicted next task. Tools used and actions performed by a user with an application are tracked (block 602). By way of example, the recommendation engine 118 obtains used tool indications 302 to track the tools used and actions performed by a user of the application 116.

Tasks performed by the user with the application are determined based on a predetermined number of the tracked tools used and actions performed (block 604). By way of example, the current task module 304 determines the task history 306 based on a predetermined number of the used tool indications 302, such as the last 15 used tool indications 302 when at least 15 tools of the application 116 have been used or actions performed. When the predetermined number of used tool indications 302 have not yet been obtained during a session (such as when the application is launched to initiate a session of interaction), the tasks may be determined from the used tool indications 302 that have been obtained. For instance, when only 5 used tool indications 302 have been obtained, the current task module 304 may use just those 5 indications to determine the task history 306.

A next task is predicted for the user based on the determined tasks (block 606). In accordance with the principles discussed herein, the next task corresponds to a task having a highest probability of being performed next. Further, the next task is predicted according to a task prediction model for the application that takes the determined tasks as input. By way of example, the recommendation engine 118 predicts the next task 308 based on the task history 306. The recommendation engine 118 predicts the next task 308 using the application-task prediction model 126, such that the next task 308 has the highest probability of being performed next (relative to other tasks) according to the application-task prediction model 126. The recommendation engine 118 determines the task having the highest probability of being performed next by using the task history 306 as input to the application-task prediction model 126.

Recommendation content that is associated with the predicted next task is retrieved (block 608). By way of example, the next task content 310 is associated with the next task 308. In this example, the recommendation engine 118 retrieves the next task content 310 from the recommendation content 128. As discussed above, the next task content 310 can be retrieved from local storage of the client device 104 or remote storage without departing from the spirit or scope of the techniques described herein.

Recommendations for tools of the application are presented by configuring an interface of the application to output the recommendation content (block 610). By way of example, the UI configuration module 314 configures an interface of the application 116 to output the next task content 310, which includes the tool recommendation 312. The application 116 then presents the configured application UI 316 to a user to deliver recommendations for the tools of the application 116.

Having described example procedures in accordance with one or more implementations, consider now an example system and device that can be utilized to implement the various techniques described herein.

Example System and Device

Figure 7:
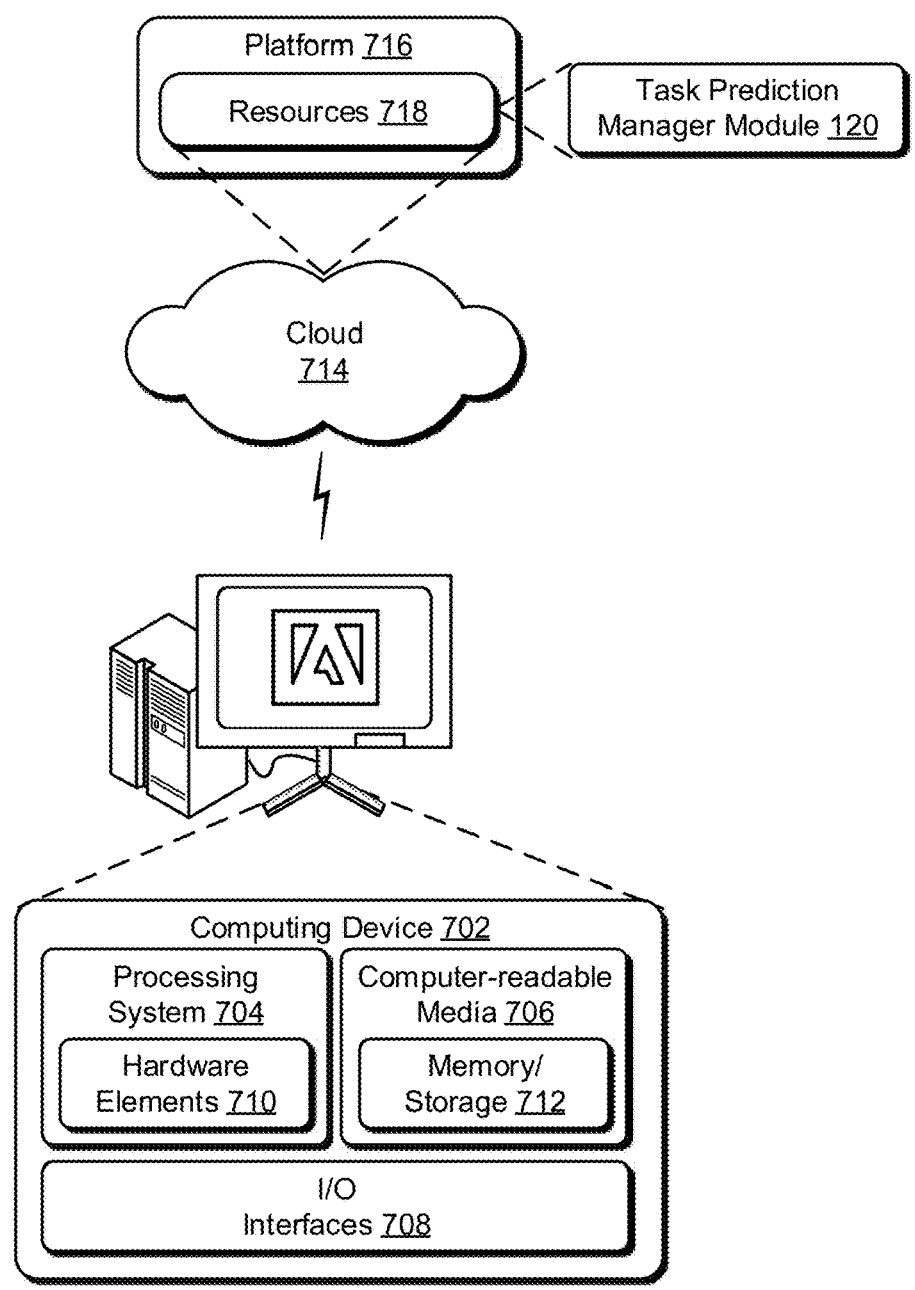
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the task prediction manager module 120. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to automatically inform users about tools of an application, a method implemented by a computing device, the method comprising:
   obtaining, by the computing device, application usage data that indicates tools used and actions performed by existing users of an application via a graphical user interface (GUI) of the application;
   generating, by the computing device, documents for sessions of interaction with the application via the GUI by the existing users, in part, by converting indications of the tools used and actions performed in the application usage data to human-readable words describing the tools used and actions performed;
   computing, by the computing device, importance scores for the tools used and actions performed by scoring the human-readable words according to a natural language processing technique;
   determining, by the computing device, tasks performed with the application via the GUI based on the importance scores, each of the tasks comprising an unordered group of the tools used and actions performed to achieve a modification with the application;
   building, by the computing device, an application-task prediction model based on the tasks and the importance scores, the application-task prediction model indicating probabilities of the tasks to be next performed via the GUI by a current application user based on the tasks previously performed via the GUI by the current application user; and generating, by the computing device, a recommendation engine for use during interaction with the application via the GUI to predict next tasks of the current application user and present tool recommendations via the GUI for the next tasks based on the next tasks having highest probabilities of being performed next as indicated by the application-task prediction model, the generating including packaging the application-task prediction model with data for retrieving the tool recommendations.

2. A method as described in claim 1, wherein a different document is generated for each of the sessions.

3. A method as described in claim 1, wherein the human readable words are scored according to term frequency-inverse document frequency (TFIDF) to compute the importance scores for the tools used and actions performed.

4. A method as described in claim 1, wherein the application usage data is configured as clickstream data indicating the tools used and actions performed by the existing users of the application via the GUI.

5. A method as described in claim 1, further comprising generating a list of the human-readable words for each of the tasks that includes the human-readable words for the tools used and actions performed of a respective unordered group.

6. A method as described in claim 5, further comprising:
clustering the tools used and actions performed into clusters of related tools and actions based on a semantic clustering of the human-readable words according to a different natural language processing technique; and
generating generalized tasks, in part, by replacing the human-readable words for the tools used and actions performed in the lists of words with human-readable cluster words for a respective said cluster of the tools used and actions performed, the application-task prediction model being further generated based on the generalized tasks.

7. A method as described in claim 1, wherein determining the tasks performed includes associating each of the human-readable words in a document generated for a session with at least one task of the session based on the importance scores using Latent Diricklet allocation (LDA).

8. A method as described in claim 1, further comprising associating the tasks with the tool recommendations and generating the data for retrieving the tool recommendations based on the associating.

9. A method as described in claim 8, wherein the recommendation module is generated to include presentation content corresponding to the tool recommendations and the data enables the presentation content to be maintained in and retrieved from local storage.

10. A method as described in claim 8, wherein the recommendation module does not include presentation content corresponding to the tool recommendations and the data enables the presentation content to be retrieved from remote storage.

11. A method as described in claim 1, wherein the tool recommendation includes at least one of:
a recommendation of one or more tools of the application to use for a next predicted task;
a recommendation for how to use capabilities of the one or more tools for the next predicted task;
an indication regarding how to select the one or more tools for use;
a video recommendation of the one or more tools; or
an animation indicating at least one of how to select the one or more tools for use or the capabilities of the one or more tools.

12. A system implemented in a digital medium environment to automatically inform users about tools of an application, the system comprising: at least one processor; and memory having stored thereon computer-readable instructions that are executable by the at least one processor to perform operations comprising: obtaining application usage data that indicates tools used and actions performed by an existing user of an application via a graphical user interface (GUI) of the application; converting indications of the tools used and actions performed in the application usage data to human-readable words describing the tools used and actions performed; and building a task prediction model for the application based on natural-language processing of the human-readable words, the task prediction model indicating probabilities of tasks that are performable with the application via the GUI to be next performed via the GUI by a current user based on tasks previously performed by the current user via the GUI, the probabilities usable to recommend tools for use via the GUI for next tasks predicted, the next tasks predicted having highest probabilities of being performed next.

13. A system as described in claim 12, wherein the operations further comprise:
obtaining additional application usage data for a different application; converting the additional application usage data to human-readable words describing tools used from the different application and actions performed with the different application via an additional GUI of the different application;
building an additional task prediction model for the different application based on natural-language processing of the human-readable words describing the tools used from the different application and actions performed with the different application, the additional task prediction model indicating probabilities of tasks that are performable with the different application to be next performed by a current user of the different application.

14. A system as described in claim 12, wherein the operations further comprise associating recommendation content with the next tasks predicted to enable the recommendation content, to be obtained for presentation via the GUI to the current user to recommend the tools.

15. In a digital medium environment to automatically inform a user about tools of an application, a method implemented by a computing device, the method comprising: obtaining,
by the computing device, indications of tools used and actions performed by the user during interaction with the application via a graphical user interface (GUI) of the application;
determining, by the computing device, tasks performed by the user with the application via the GUI based on a predetermined number of the obtained indications and by processing human-readable words, that correspond to the tools used and actions performed as indicated by the obtained indications, with a natural language processing technique; predicting, by the computing device, a next task the user performs with the application via the GUI, the next task having a highest probability of being performed next according to a task prediction model associated with the application that indicates probabilities of tasks being performed next based on the tasks determined; and presenting, by the computing device, recommendation content associated with the next task.

16. A method as described in claim 15, wherein the recommendation content is presented via at least one of:
   a graphical user interface of the application displayed via a display device associated with the computing device;
   an overlay that overlays at least a portion of the graphical user interface; or
   a voice user interface configured to output the recommendation content via one or more speakers associated with the computing device.

17. A method as described in claim 15, further comprising:
   obtaining an additional indication of a next tool used or action performed by the user via the GUI during the interaction;
   determining updated tasks performed by the user with the application based on the predetermined number of indications, including the additional indication;
   predicting a new next task the user performs with the application via the GUI, the new next task having the highest probability of being performed next according to the task prediction model based on the updated tasks determined; and
   presenting recommendation content associated with the new next task.

18. A method as described in claim 15, further comprising:
   retrieving the recommendation content associated with the next task; and
   configuring the GUI with the recommendation content to present recommendations of one or more tools of the application for use in connection with the next task.

19. A method as described in claim 18, wherein the recommendation content is retrieved from local storage of the computing device.

20. A method as described in claim 18, wherein the recommendation content is retrieved from remote storage accessible to the computing device over a network.

* * * * *